Sept. 24, 1963        D. E. FELAND        3,104,722
ROCK PICKER
Filed April 24, 1962        4 Sheets-Sheet 1
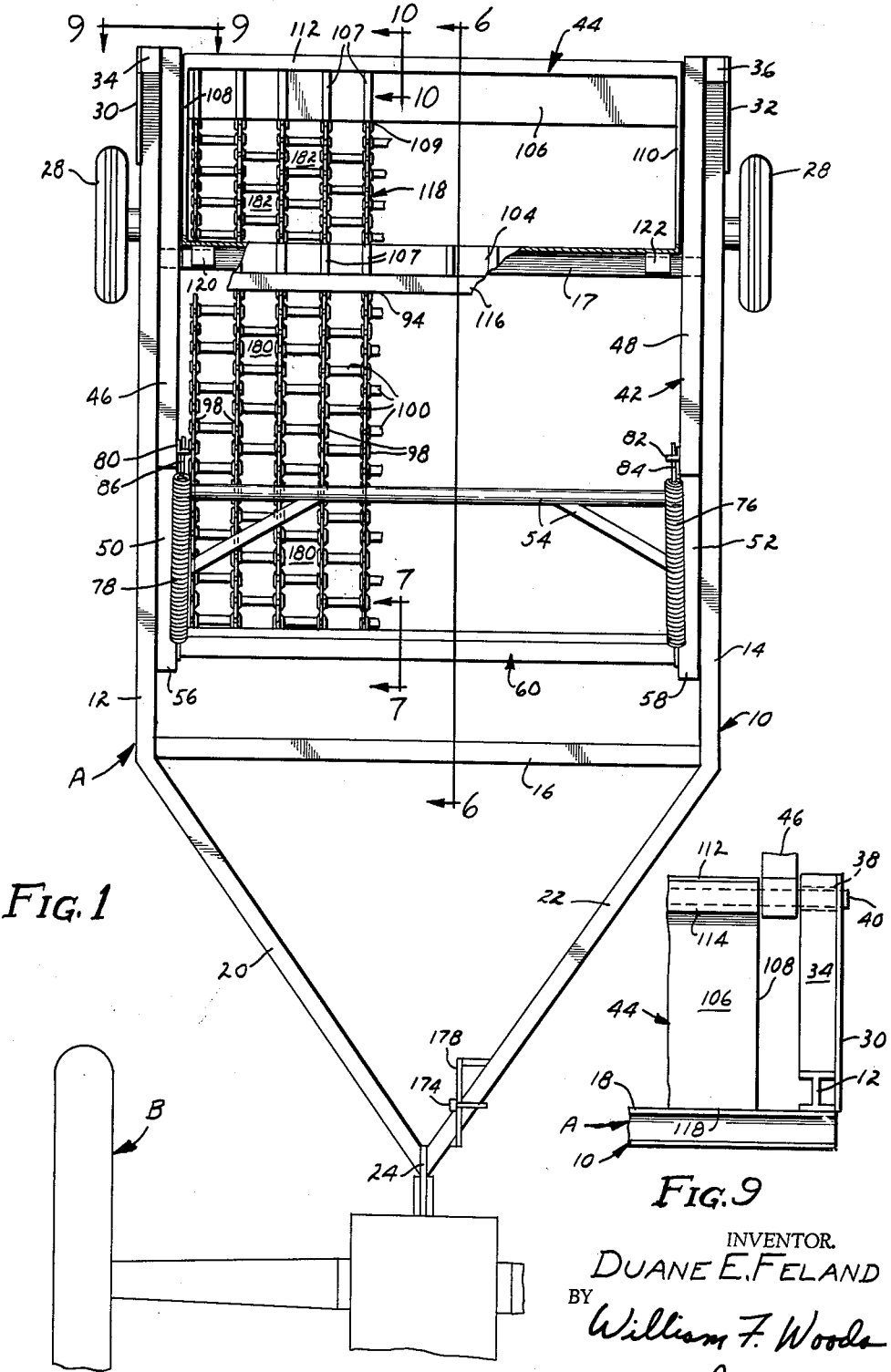
INVENTOR.
DUANE E. FELAND
BY William F. Woods
ATTORNEY Sept. 24, 1963  D. E. FELAND  3,104,722
ROCK PICKER
Filed April 24, 1962  4 Sheets-Sheet 2
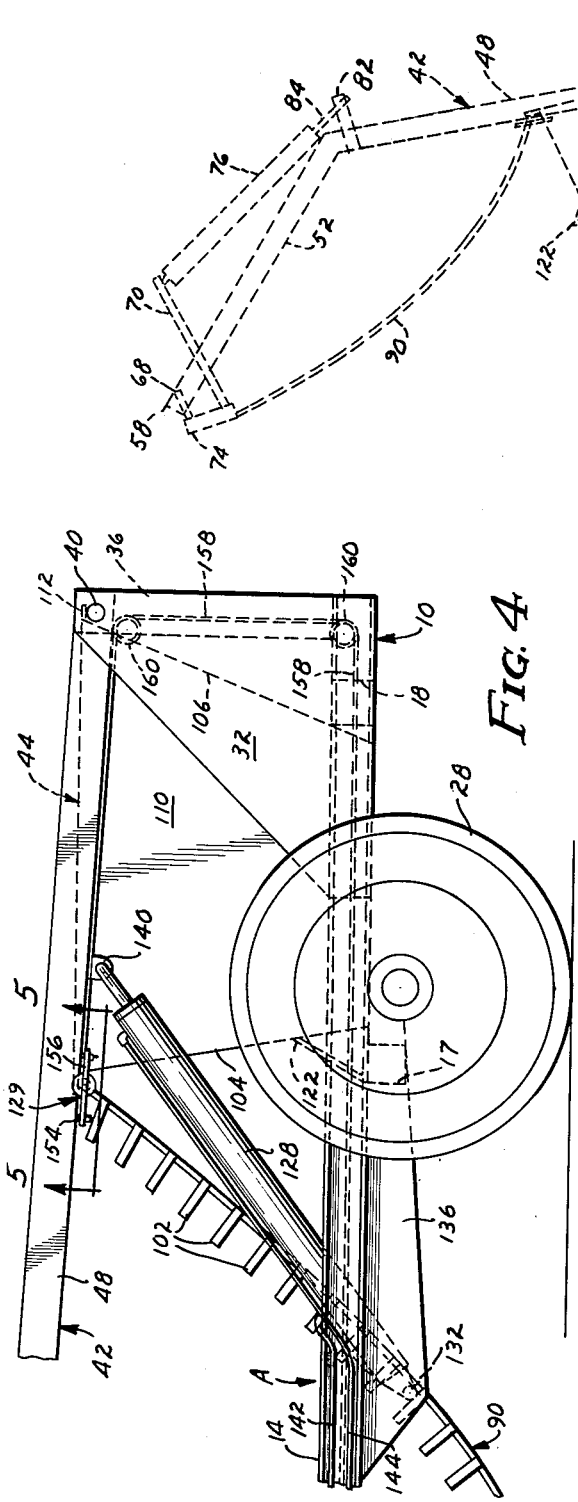
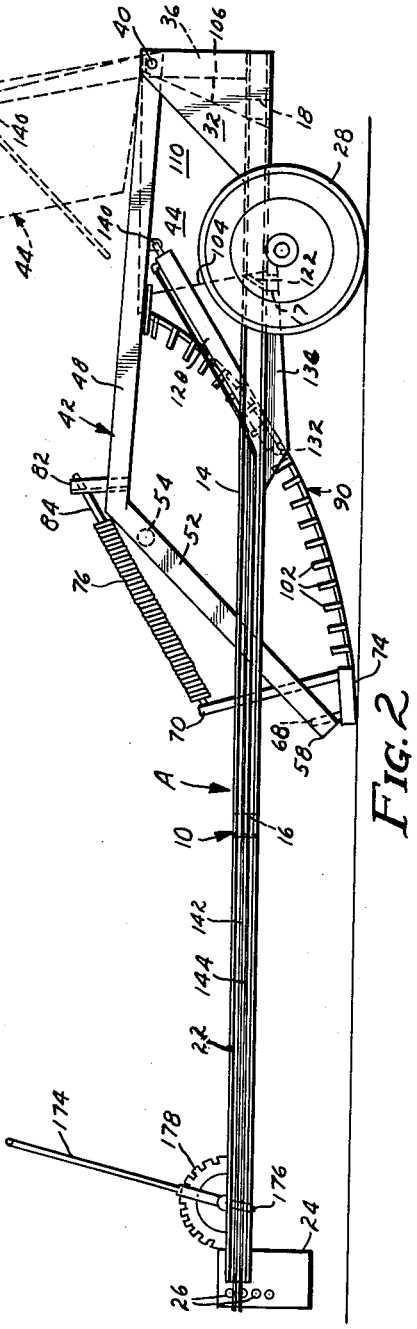
INVENTOR.
DUANE E. FELAND
BY William F. Woods
ATTORNEY Sept. 24, 1963  D. E. FELAND  3,104,722
ROCK PICKER
Filed April 24, 1962  4 Sheets-Sheet 3
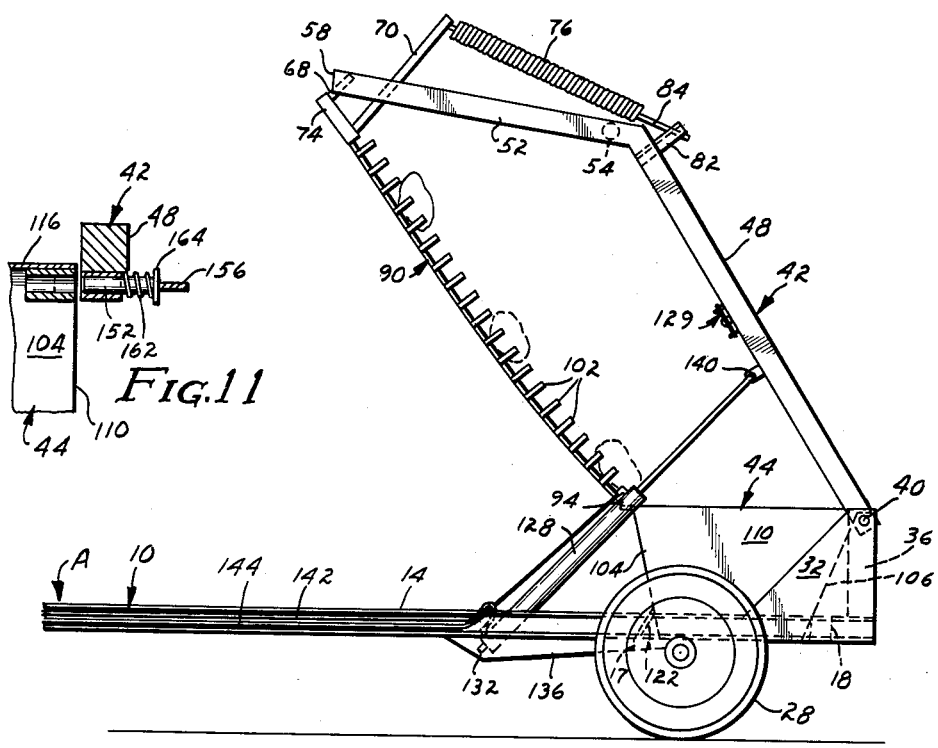
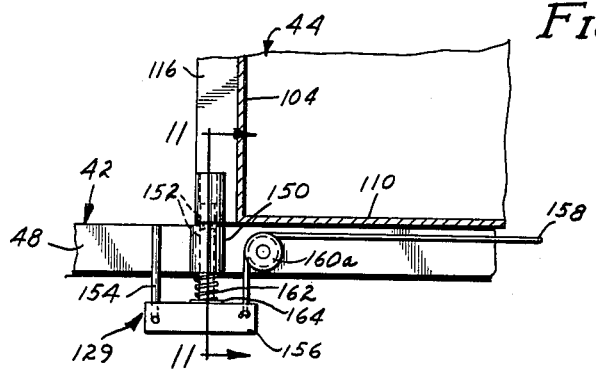
INVENTOR.
DUANE E. FELAND
BY
William F. Woods
ATTORNEY Sept. 24, 1963        D. E. FELAND        3,104,722
ROCK PICKER
Filed April 24, 1962                                 4 Sheets-Sheet 4
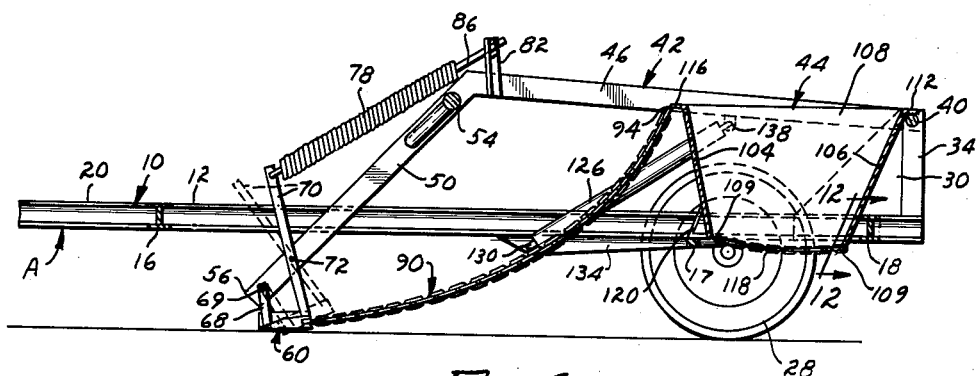
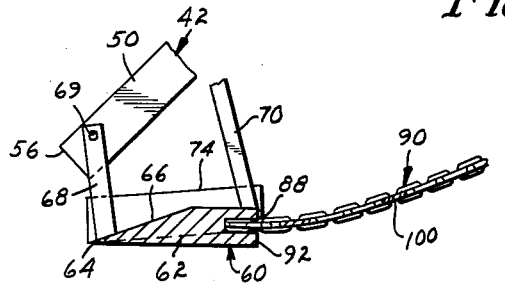
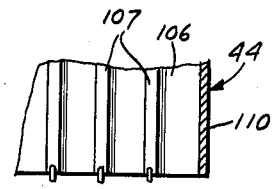
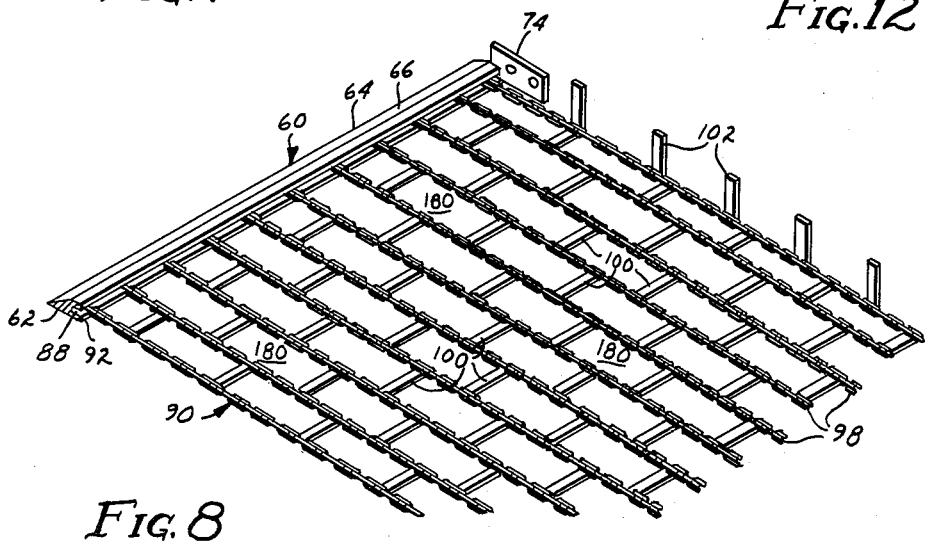
INVENTOR.
DUANE E. FELAND
BY
William F. Woods
ATTORNEY United States Patent Office 3,104,722
Patented Sept. 24, 1963

3,104,722
ROCK PICKER
Duane E. Feland, Antler, N. Dak., assignor to Steinman Manufacturing, Carrington, N. Dak., a sole proprietorship
Filed Apr. 24, 1962, Ser. No. 189,893
13 Claims. (Cl. 171—63)

This invention relates to a new and improved machine adapted to remove objects imbedded within or lying upon the ground; in particular, it concerns a rock picker characterized by novel structural and functional attributes.

Various types of machines have been developed for gathering loose rocks from a field or digging them from beneath the surface of the soil and transporting them to a place of deposit where they are dumped. The majority of these machines employ generally elongated tines of one kind or another for getting in under the rocks and transferring them to a collector or bucket while the machine is drawn behind a tractor. Some go further and have rather elaborate structural features designed to scavenge the rocks from the tines into the collector. While many of the prior art machines work rather well in areas where the rocks are loosely laid on top of the ground, they all seem to possess shortcomings when they are used to dig rocks that are partially or wholly buried in the soil. The reason for their inadequacy in this regard is due mainly to the tines that are prone to breakage whenever a pronounced resistance in the form of a large buried rock is met. Such a condition is entirely to be expected as the shock imposed by striking such an object often results in failure of one or more tines because of the localized concentration of stresses set up in the individual tines contacting the object. To design and fabricate tines adapted to resist such impacts would require boosting the cost of the machine beyond the reach of the average user, who in most cases are farmers reluctant to spend a great deal of money for such a product.

Accordingly, it is an important object of this invention to provide a machine that will overcome the above disadvantages and limitations.

Another primary object of this invention is to provide an improved machine for picking, transferring and dumping rocks.

Another object of this invention is to provide a new and improved rock picker characterized by novel rock engaging, transferring and dumping elements.

Yet another object of this invention is to provide in a rock picker novel means for picking and transferring rocks from the ground to a collector.

Another object of this invention is to provide in a rock picker novel means for moving rocks from the forward end of the machine to the rear thereof without carrying dirt and other debris with the rocks that are handled.

Still another object of this invention is to provide in a rock picker novel means for yieldably mounting the rock engaging elements of the machine so as to avoid injury to the machine due to shock loading.

A further object of this invention is to provide in a rock picking machine novel means for facilitating the dumping of the rocks collected by the machine.

Another object of this invention is to provide in a rock picking machine novel and improved structure adapted to pick rocks, transfer the picked rocks to a collector, and dump the rocks from the collector, all of the elements being so arranged and constructed as to coact in an unusual manner to produce the desired results.

A further object of this invention is to provide a machine of the type described that is relatively inexpensive to produce, easy to operate, rugged in construction and extremely durable.

Another object of this invention is to provide a rock picking machine that can be drawn behind a conventional tractor and operated therefrom through use of a conventional tractor and operator therefrom through use of a conventional source of hydraulic or other suitable power.

Still another object of this invention is to provide a rock picker that does not rely upon tines or other similar shock-sensitive means for initially engaging the rock during the picking operation.

Another object of this invention is to provide a rock picker having unusually large rock carrying capacity in relation to its overall size and adapted to transport the rocks over rough ground without danger of tipping or prematurely discharging the load.

Another object of this invention is to provide in a rock picking machine novel means for controlling the coaction of the collector element with the rock digging and transferring elements so that rocks may be easily dumped from the machine at the point of deposit by virtue of control means operated from the tractor or other prime mover.

A further object of this invention is to provide in a rock picking machine a novel picker blade adapted to root out and transfer rocks from beneath the soil so that the rocks may be subsequently transferred in a novel manner to a collector for dumping.

Another object of this invention is to provide novel means for transferring rocks that have been engaged by the picker blade to a collector for dumping.

These and other objects and advantages of the invention will become apparent from a consideration of the following detailed description and accompanying drawings wherein a preferred embodiment of the invention is shown by way of illustration and not by way of limitation.

In the drawings:

FIGURE 1 is a top plan view of the invention shown mounted behind a tractor in a normal rock picking position;

FIGURE 2 is a side elevational view of the invention with the movable elements thereof shown in a ground engageable rock digging position in solid lines and in a rock dumping position in dotted lines;

FIGURE 3 is a fragmentary side elevational view of the invention showing the movable elements thereof in a rock transferring position;

FIGURE 4 is an enlarged fragmentary side elevational view of part of the invention;

FIGURE 5 is an enlarged fragmentary view taken on the line 5—5 of FIGURE 4;

FIGURE 6 is a fragmentary side elevational view of the invention, partially in section, taken along the line 6—6 of FIGURE 1, with the movable elements thereof in a rock digging or ground engaging position, the picker blade mounting assembly being shown in two positions;

FIGURE 7 is an enlarged fragmentary elevational view, partially in section, taken on the line 7—7 of FIGURE 1;

FIGURE 8 is a fragmentary perspective view of the picker blade and apron assembly forming part of the invention;

FIGURE 9 is an enlarged fragmentary elevational view taken on the line 9—9 of FIGURE 1;

FIGURE 10 is an enlarged fragmentary elevational view, partially in section, taken on the line 10—10 of FIGURE 1;

FIGURE 11 is an enlarged fragmentary view, partially in section, taken on the line 11—11 of FIGURE 5; and FIGURE 12 is an enlarged fragmentary view taken on the line 12—12 of FIGURE 6.

Referring now to the drawings and more particularly to FIGURES 1 and 2 thereof, the invention, indicated in its entirety by the reference character A, includes a mobile supporting carriage or framework 10 characterized by longitudinal side stringers 12, 14 joined laterally by suitable cross members 16, 17, 18, and terminating at the forward end thereof in a pair of converging structural members 20, 22. At the apex of the triangle formed by the joining of members 20, 22 a tractor engageable plate 24 having vertically spaced holes 26 is provided to permit carriage 10 to be drawn by tractor B. As shown, wheels 28 are mounted upon carriage 10 slightly forwardly of the rear thereof.

Carried at each rear corner of carriage 10 upon stringers 12, 14 are generally triangular shaped upstanding gusset plates 30, 32 which support and reinforce trunnion posts 34, 36, respectively, as shown more clearly in FIGURE 9. Posts 34 and 36 and plates 30, 32 are bored, as at 38 to receive a laterally extending rear pivot member 40 which extends therebetween in vertically spaced relation to stringers 12, 14 and rear cross member 18.

Rear pivot member 40 which is preferably a cylindrical shaft of suitable strength and cross-section, pivotally carries two rotatable elements thereon. The first of these is an inner frame 42 of slightly less width than the internal width of carriage 10 and extending forwardly from the rear thereof. The second movable element carried by pivot member 40 is a rock collector or bucket generally designated by reference character 44. Bucket 44 is rotatable about pivot member 40 from a generally horizontal position, shown by the solid lines in FIGURE 3, into an elevated dumping position, illustrated by the dotted lines of FIGURE 2. As shown, the length of bucket 44 is slightly less than the distance between the frame elements 46, 48 of frame 42 so that both frame 42 and bucket 44 may be pivoted about the axis defined by pivot member 40 without interference.

Frame 42 includes a pair of laterally spaced forwardly extending structural members 46, 48 which terminate in a pair of generally integral downwardly and forwardly extending arms 50, 52. Near the juncture of members 46, 48 and arms 50, 52, suitable cross bracing 54 is provided. Arms 50, 52 terminate in forward ends 56, 58 which, by virtue of the aforementioned pivotal connection between frame 42 and the rear of carriage 10 assume a depending position adjacent the ground. Yieldably mounted between ends 56, 58 of arms 50, 52 is a picker blade 60. Picker blade 60, preferably made of manganese steel or other suitable shock resistant material, consists of a generally flat body 62 of sufficient thickness to absorb the loading imposed during operation of the machine, the forward edge 64 of which is bevelled along the top surface 66 to form an inclined rock engaging working surface. This construction is set forth in detail in FIGURES 6-8, inclusive. Means for yieldably mounting picker blade 60 between arms 50, 52 include a forward link member 68 pivotally carried, as at 69, by the ends 56, 58 of arms 50 and 52 and extending therebelow. Further provided are a pair of rear link members 70 pivotally mounted intermediate their length, as at 72, to arms 50, 52 rearwardly of link members 68. Rigidly attached to each end of picker blade 60 is a crank member 74, to which is pivotally secured the lower ends of link members 68 and 70. The upper end of link members 70 are each attached to tension coil spring members 76, 78 which are anchored to structural members 46, 48, respectively, of frame 10 by means of upright standards 80, 82 and connecting bars 84 and 86. This arrangement results in the normal biasing of picker blade 60 in the forward position indicated by the solid line representation of FIGURE 6. Upon striking a stubborn rock, picker blade 60 is allowed to pivot about the axes defined by connections 69, 72 into the position indicated by the dotted lines of FIGURE 6 against the considerable spring pressure exerted by spring members 76 and 78.

Rocks engaged by picker blade 60 are delivered by force of the forward progress of the machine onto a generally rearwardly inclined flexible open mesh apron, generally referenced by number 90 in the drawings. Apron 90 is attached at its forward edge 92 to picker blade 60 in the manner shown in FIGURES 7 and 8. A rearwardly open recess 88 in picker blade 60 accommodates the forward edge 92 of apron 90 to which it is secured by suitable means. The rearward edge 94 of apron 90 is secured to the top of the forward edge of bucket 44, as will be explained, resulting in the suspension of apron 90 between bucket 44 and picker blade 60. Sufficient length of apron 90 is provided so that it is somewhat loosely suspended between its ends, as shown.

Referring to FIGURE 8 of the drawings, apron 90 includes a plurality of chain members 98 longitudinally arranged between picker blade 60 and bucket 44. Between each row of chain members 98 are provided a series of longitudinally spaced transverse connectors 100, the connectors 100 in each row being staggered longitudinally with respect to the connectors 100 in the adjacent row. Upstanding side supports 102 are longitudinally spaced along each side of apron 90 to prevent the spilling of rocks therefrom during the operation of the machine.

Turning now to the details of the rock collector or bucket 44, this element consists of generally inclined slightly converging front and rear panels 104, 106 and side panels 108, 110 connected thereto. The upper edge of rear panel 106 has a flanged generally horizontal extension 112 which carries therebelow a lateral hollow support 114 extending across the length of bucket 44. Support 114 is surroundingly engageable with pivot member 40 to permit the rotation of bucket 44 thereabout. The upper edge of front panel 104 of bucket 44 is provided with a forwardly extending lateral flange 116 to which is secured the rearward edge 94 of apron 90. Brackets 120, 122 rigidly secured to the lower portions of front panel 104 of bucket 44 provide support therefor when it is in a horizontal position as they rest upon intermediate cross member 17 of carriage 10 when bucket 44 is lowered from an elevated position, as will be explained.

The bottom 118 of bucket 44 consists of an open mesh construction similar to that described with reference to apron 90. As shown in FIGURES 6 and 12, panels 104 and 106 of bucket 44 are equipped with spaced stiffeners 107 which extend upwardly from the lower edges thereof. Stiffeners 107 are apertured or otherwise suitably formed to receive and support the ends of apron 109 which is suspended between panels 104 and 106 to form bottom 118.

Means for raising and lowering frame 42 with respect to carriage 10 are provided in the form of a pair of double-acting hydraulic jacks 126, 128 that are pivotally mounted at their lower ends to stub shafts 130, 132, respectively, carried by supporting plates 134, 136 secured beneath stringers 12, 14, respectively, of carriage 10 forwardly of bucket 44. The upper end of jacks 126, 128 are attached to frame 42 by virtue of brackets 138, 140 secured to structural members 46 and 48, respectively. Hydraulic fluid pressure is supplied to the cylinders of jacks 126, 128 through conventional conduit means 142, 144, which is connected to suitable pressure and control means (not shown) installed on the tractor B or other prime mover. The double acting nature of jacks 126, 128 permit a downward thrust to be applied to frame 42 when it is in a ground engaging position and also allows the rotation of frame 42 about pivot member 40 in a rearwardly and upwardly direction, as will be explained.

FIGURES 4, 5 and 11 illustrate the means (generally designated by reference numeral 129) used to releasably lock bucket 44 to frame 42 during the rock dumping operation of the machine. A hollow sleeve or support 150 is carried by structural members 46, 48 of frame 42 in register with the forward flange 116 of bucket 44 and therebelow. Locking pins 152 are slidably contained within sleeves 150 and adapted to move into or out of engagement with the lower surface of flange 116 of bucket. Means for displacing pins 152 in such a manner include a fixed forward anchor 154 to which is pivotally secured a crank member 156 which bears intermediate its length against the outer end of pin 152. A cable 158 guided by suitably positioned pulleys 160 causes crank 156 to move pin 152 into engagement with flange 116 of bucket 44 against the pressure exerted by coil spring 162. Spring 162 normally biases crank member 156 and pin 152 out of engagement with bucket 44, as indicated by the solid lines of FIGURE 5. Collar 164 serves as a common connector for crank 156, pin 152 and spring 162. As shown in FIGURE 5, pulley 160a is located so that part of cable 158 extending from the rear of crank 156 thereto is generally parallel to the axis of pin 152. Operator control of the locking means just described consists of a lever 174 pivotally mounted on the forward end of carriage 10 within convenient reach of the operator. The lower end 176 of lever 174 is attached to cables 158, which run along the outside of the frame elements of carriage 10. A toothed semicircular sector plate 178 allows locking of lever 174 in a selected position so that control of locking means 129 is positive and simple to operate.

Operation of the Machine

The machine is operated for rock digging and picking by pulling it along a field or other surface in the manner illustrated in FIGURES 2 and 6. If a relatively deep cut is desired, jacks 126, 128 can be employed to exert a downward thrust upon the ground-engaging picker blade 60. As mentioned earlier, any unusual shock loads are absorbed by the yieldable mounting features of blade 60. Rocks are scooped up by the forward edge 64 of picker blade 60 and are delivered to apron 90 by the forward momentum of the machine. Side supports 102 prevent the rocks from spilling out of apron 90 during the picking operation. It can be seen that dirt and other debris carried along with the rocks will fall through the openings 180 in apron 90 (see FIGURES 1 and 8) leaving only the rocks themselves for further handling. If clods of dirt or turf stick to the rocks during this stage of the operation, they are removed when the rocks are delivered to bucket 44 inasmuch as bottom 118 thereof is similarly provided with openings 182 for this purpose.

When apron 90 is filled with rocks, fluid pressure is applied to jacks 126, 128 while locking means 129 is in a normally disengaged position. This action causes frame 42 to pivot upwardly and rearwardly about pivot member 40 into the position illustrated by FIGURE 3. The rocks are discharged by gravity from apron 90 into bucket 44 for delivery to a suitable place of deposit. It is then possible to again fill apron 90 with rocks or bucket 44 can be immediately emptied, depending upon the particular circumstances.

The dumping sequence of operation is illustrated by the dotted line representation of FIGURE 2. In this phase, locking means 129 is manipulated by lever 144 so that pins 152 lockingly engage flange 116 of bucket 44 while the machine is in a lowered position. Fluid pressure is applied to jacks 126, 128 in the manner previously outlined for the rock transferring phase of the operation so that frame 42 is again pivoted about axis 40 into the elevated position shown in FIGURE 2. Bucket 44, by virtue of locking means 129, is caused to be raised with frame 42 so that the rocks contained therein are dumped rearwardly of the machine. Lowering of frame 42 into a normal ground engaging position and releasing locking means 129 by lever 174 permits a new cycle of operation.

The operational flexibility afforded by this arrangement of the elements forming the machine will be readily understood. For example, the construction set forth allows an operator to use both the hydraulic jacks 126, 128 and springs 76, 78 to jar loose rocks that are embedded beneath the soil. The dirt that is necessarily carried along by such techniques presents no difficulties because of the open mesh construction of apron 90 and bottom 118 of bucket 44. Differences in terrain and condition of the soil are also accommodated by the vertical adjustment provided by spaced holes 26 in plate 24. The machine is adapted for use by one man. It has been sufficiently tested and found to be entirely satisfactory for the use intended. It will be obvious to those skilled in the art that the invention may be modified by many substitutions and equivalents and that this disclosure is intended to be illustrative only.

I, therefore, intend to be limited solely by the scope of the appended claims.

I claim:

1. In a rock picking machine, a mobile supporting outer framework, an inner frame pivoted at its rear end to the rear of said framework about a horizontal axis to swing through a nearly vertical position, said frame including a pair of laterally spaced downwardly and forwardly extending arms movable into and out of said framework, a picker blade carried between the forward ends of said arms, a bucket pivotally carried within said inner frame and mounted for swinging movements about the said horizontal axis, said bucket being normally supported in a generally horizontal collecting position by said framework and being movable to a rear dumping position, a flexible open mesh apron suspended between said bucket and said picker blade, means for releasably locking said bucket into engagement with said inner frame for rotation therewith, and means for pivoting said inner frame upwardly and rearwardly into an elevated position with respect to said framework whereby to transfer rocks from said apron into said bucket when said locking means is disengaged and to dump rocks from said bucket when said locking means is engaged.

2. The machine described in claim 1 wherein yieldable mounting means is provided for said picker blade.

3. The machine of claim 1 wherein said means for releasably locking said bucket into engagement with said inner frame is normally biased so that said bucket is out of engagement with said frame.

4. The machine described in claim 1 wherein said flexible open mesh apron is loosely suspended between said bucket and said picker blade.

5. The machine of claim 1 wherein said flexible open mesh apron consists of longitudinally extending spaced parallel chain members secured at their ends to said picker blade and said bucket, parallel spaced transverse members connecting said chain members, and upstanding longitudinally spaced side supports secured to each longitudinal edge of said apron.

6. The machine of claim 1 wherein said picker blade is provided with a rearwardly open recess and wherein said apron is mounted at its forward end within the recess of said picker blade.

7. The machine of claim 2 wherein said yieldable mounting means includes spring means mounted on the forwardly extending arms of said inner frame, and linkage means cooperatively connecting said picker blade to said inner frame and to said spring means whereby said picker blade is normally spring urged into a forward position and is movable rearwardly and upwardly against the pressure of said spring means upon the engagement of said picker blade with an immovable object.

8. The machine of claim 7 wherein said spring means is mounted generally above the plane of said inner frame, and wherein said linkage means consists of forward link structure secured to said inner frame and to the forward edge of said picker blade, rear link structure pivotally secured intermediate its length to said inner frame rearwardly of said forward link structure and attached at its ends to said spring means and to the rear of said picker blade.

9. The machine of claim 1 wherein said releasable locking means includes pin means carried on said inner frame for slidable movement into and out of supporting engagement with the forward end of said bucket, means for normally urging said pin means out of engagement with said bucket, and operator control means for selectively locking said pin means into supporting engagement with the forward end of said bucket.

10. The machine of claim 1 wherein said bucket is provided with a flexible open mesh bottom.

11. The machine of claim 1 wherein said means for pivoting said inner frame includes means for applying a downward thrust to said frame and said picker blade.

12. In a rock picker, a longitudinal wheeled outer frame, a horizontal transverse pivot member carried at the rear of said outer frame, a forwardly extending inner rame mounted at its rear end on said pivot member, said inner frame being swingable from a generally horizontal rock gathering position upwardly and rearwardly into rock transferring and rock dumping positions, a rock collecting and dumping bucket mounted at its rear on said pivot member, said bucket being swingable from a generally horizontal rock collecting position within said inner frame upwardly and rearwardly to a rock dumping position, a picker blade mounted upon the forward end of said inner frame, a flexible open mesh apron suspended between said picker blade and said bucket, hydraulic cylinder means extending between said inner frame and said outer frame for raising and lowering said inner frame, and means for selectively locking said bucket to said inner frame for rotation therewith into a dumping position.

13. In a rock picker, a longitudinal wheeled outer frame, upstanding laterally spaced support brackets carried at the rear of said outer frame, a transverse pivot member mounted between said brackets above said outer frame, a forwardly extending inner frame mounted at its rear end on said pivot member and swingable from a generally forwardly extending horizontal rock gathering position upwardly and rearwardly into a nearly vertical position, a bucket carried within said inner frame and mounted at its rear end on said transverse pivot member, a picker blade yieldably mounted at the forward end of said inner frame, a flexible open mesh apron suspended between said inner frame and said outer frame for raising and lowering said inner frame, and means for selectively releasably locking said bucket to said inner frame.

References Cited in the file of this patent
UNITED STATES PATENTS

| | | |
|---|---|---|
| 1,266,376 | Alexander et al. | May 14, 1918 |
| 2,852,082 | Petersen | Sept. 16, 1958 |
| 2,980,189 | Jacobs | Apr. 18, 1961 |